US010992614B1

(12) United States Patent
Pedersen et al.

(10) Patent No.: US 10,992,614 B1
(45) Date of Patent: Apr. 27, 2021

(54) FORMAT-DYNAMIC STRING PROCESSING IN GROUP-BASED COMMUNICATION SYSTEMS

(71) Applicant: Slack Technologies, Inc., San Francisco, CA (US)

(72) Inventors: Andreas Haugstrup Pedersen, San Francisco, CA (US); Wayne Fan, San Francisco, CA (US); Ryan Greenberg, Albany, CA (US); Ittai Sean Barzilay, San Francisco, CA (US); Tyler Lewis, San Francisco, CA (US); Madeline Shortt, San Francisco, CA (US)

(73) Assignee: Slack Technologies, Inc., San Francisco, CA (US)

( * ) Notice: Subject to any disclaimer, the term of this patent is extended or adjusted under 35 U.S.C. 154(b) by 32 days.

(21) Appl. No.: 16/659,274

(22) Filed: Oct. 21, 2019

(51) Int. Cl.
*H04L 12/58* (2006.01)
*G06F 40/109* (2020.01)
*G06F 40/117* (2020.01)
*G06F 40/103* (2020.01)

(52) U.S. Cl.
CPC .......... *H04L 51/066* (2013.01); *G06F 40/103* (2020.01); *G06F 40/109* (2020.01); *G06F 40/117* (2020.01); *H04L 51/06* (2013.01); *H04L 51/063* (2013.01)

(58) Field of Classification Search
CPC ..... G06F 40/103; H04L 51/06; H04L 51/063; H04L 51/066
See application file for complete search history.

(56) References Cited

U.S. PATENT DOCUMENTS

| | | | |
|---|---|---|---|
| 6,799,301 B1* | 9/2004 | Francis | G06F 40/14 715/210 |
| 10,430,512 B1* | 10/2019 | Pedersen | G06F 40/205 |
| 2004/0243926 A1* | 12/2004 | Trenbeath | G06Q 10/107 715/239 |
| 2007/0074178 A1* | 3/2007 | Schwartz | G06F 8/73 717/136 |
| 2007/0150163 A1* | 6/2007 | Austin | G06F 16/34 701/102 |
| 2012/0311426 A1* | 12/2012 | Desai | G06F 40/205 715/227 |
| 2014/0154648 A1* | 6/2014 | Gonsalves | G06F 11/0742 434/219 |
| 2018/0287982 A1 | 10/2018 | Draeger et al. | |

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Jeong S Park
(74) *Attorney, Agent, or Firm* — Lee & Hayes, P.C.

(57) ABSTRACT

Embodiments of the present disclosure provide methods, systems, apparatuses, and computer program products that enable performing format-dynamic string processing in a group-based communication system.

20 Claims, 9 Drawing Sheets

(56) References Cited

OTHER PUBLICATIONS

"How Slack changed the way we work by pulling the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.
Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications-", FUJITSU Sci. Tech. J., 36, 2, (Dec. 2000) 154-161.
Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-ald9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

\* cited by examiner

FORMAT-DYNAMIC STRING PROCESSING IN GROUP-BASED COMMUNICATION SYSTEMS

BACKGROUND

String processing is central to operational effectiveness of various software applications, such as various communication software applications. Applicant has identified several deficiencies and problems associated with string processing in existing software applications. Through applied effort, ingenuity, and innovation, many of these identified problems have been solved by developing solutions that are included in embodiments of the present disclosure, many examples of which are described in detail herein.

BRIEF SUMMARY

Embodiments disclosed herein are directed to performing format-dynamic string processing in a group-based communication system. The group-based communication system includes a group-based communication server, a group-based communication repository, and a plurality of group-based communication channels.

According to some aspects of the present disclosure, an apparatus for performing format-dynamic string processing in a group-based communication system is disclosed. The disclosed apparatus comprises at least one processor and at least one memory including computer program code. The memory and the computer program code are configured to, with the processor, cause the apparatus to perform operations configured to receive, from a source client device associated with the communication system, an input string, wherein the string input is associated with a structured format; determine whether the structured format is a universal format of one or more universal formats associated with the communication system or a non-universal format of one or more non-universal formats associated with the communication system; and in response to determining that the structured format is a non-universal format of the one or more non-universal formats, generate, based on the input string, one or more fallback data objects associated with the input string, wherein each of the one or more fallbacks is associated with a respective universal format of at least one of the one or more universal formats; generate a composite data object based on the input string and each of the one or more fallback data objects; and transmit the composite data object to each destination client device of one or more destination client devices.

In some embodiments, the at least one memory and the computer program code are further configured to, with the at least one processor, cause the apparatus to, in response to determining that the structured format is a universal format of the one or more universal formats, transmitting the input string to each destination client device of one or more destination client devices. In some embodiments, the one or more non-universal formats comprise a serialization-based structured format. In some embodiments, the serialization-based structured format is a Rich Structured format (RTF) structured format. In some embodiments, the communication system is a group-based communication system.

In some embodiments, the one or more universal formats and the one or more non-universal formats are defined with respect to a structured format integration procedure, the structured format integration procedure comprises a plurality of software update releases associated with the communication system, the plurality of software update releases comprises one or more display-related update releases and one or more composition-related update releases, and the one or more display-related update releases are performed prior to the one or more composition-related update releases. In some embodiments, the computer program code configured to, with the at least one processor, cause the apparatus to identify the one or more non-universal formats and the one or more non-universal formats, wherein identifying the one or more universal formats and the one or more non-universal formats comprises, for each supported structured format associated with the communication system, determining an integration ratio associated with the supported structured format, determining whether the integration ratio satisfies one or more integration threshold criteria, in response to determining that the integration ratio satisfies the one or more integration threshold criteria, determining that the supported structured format is a universal format of the one or more universal formats, and in response to determining that the integration ratio fails to satisfy the one or more integration threshold criteria, determining that the supported structured format is a non-universal format of the one or more non-universal formats. In some embodiments, the integration ratio for the supported structured format is determined based on an updated device ratio for a software update release associated with the supported structured format. In some embodiments, the structured format indicates one or more presentation feature encoding protocols associated with the input string.

BRIEF DESCRIPTION OF THE DRAWINGS

Figure 1:
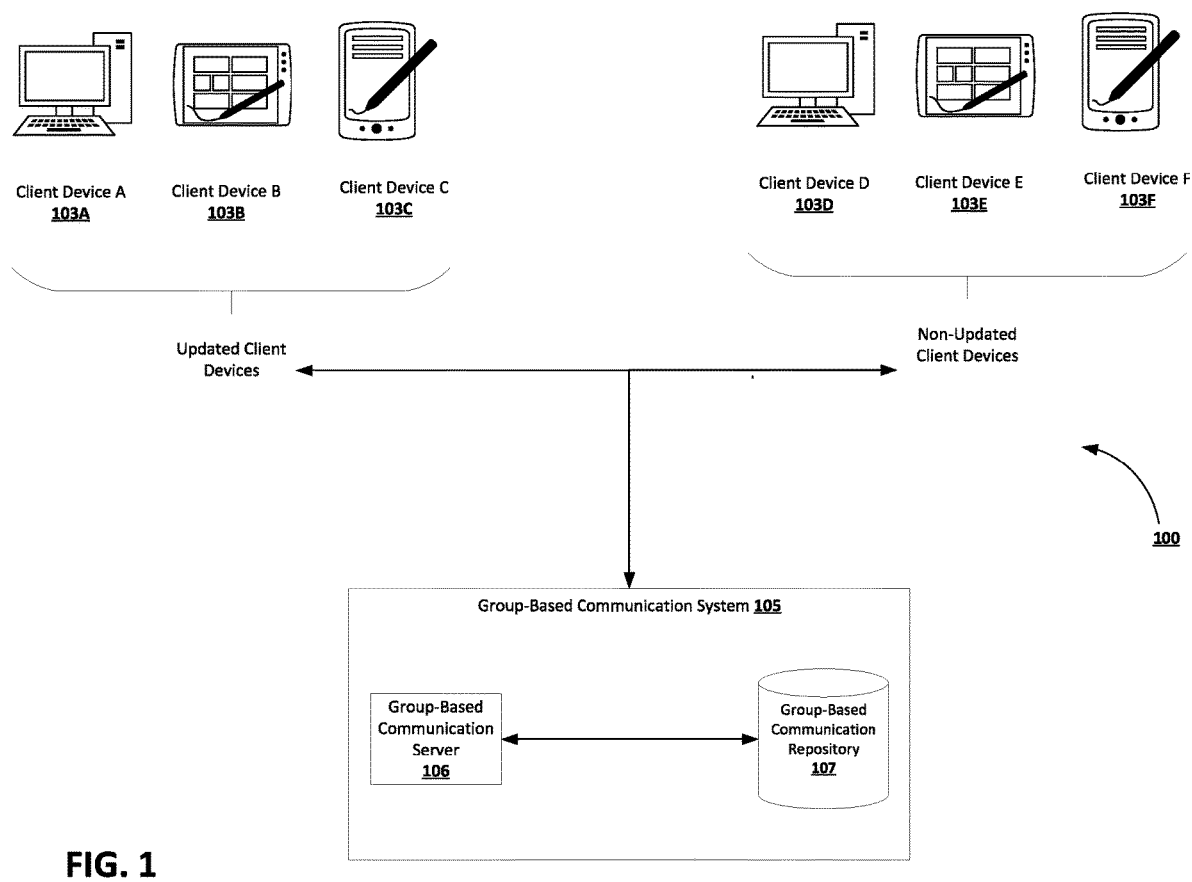

Having thus described the disclosure in general terms, reference will now be made to the accompanying drawings, which are not necessarily drawn to scale, and wherein:

FIG. 1 depicts an example architecture for implementing some embodiments of the present disclosure.

Figure 2:
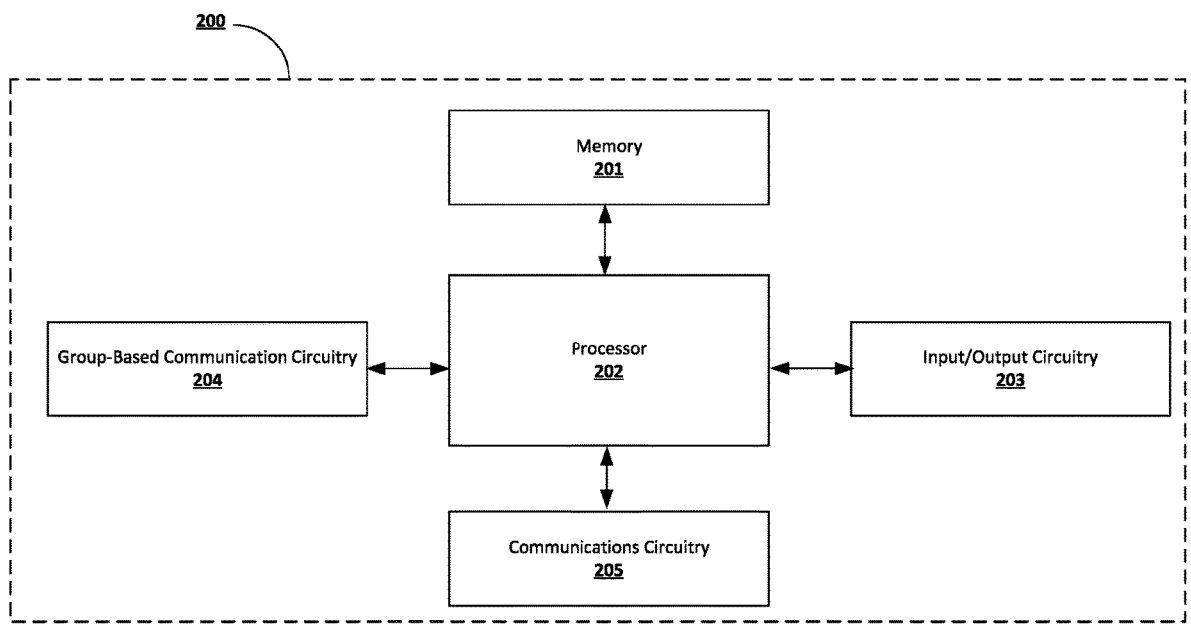

FIG. 2 depicts an exemplary apparatus for a group-based communication server according to some embodiments of the present disclosure.

Figure 3:
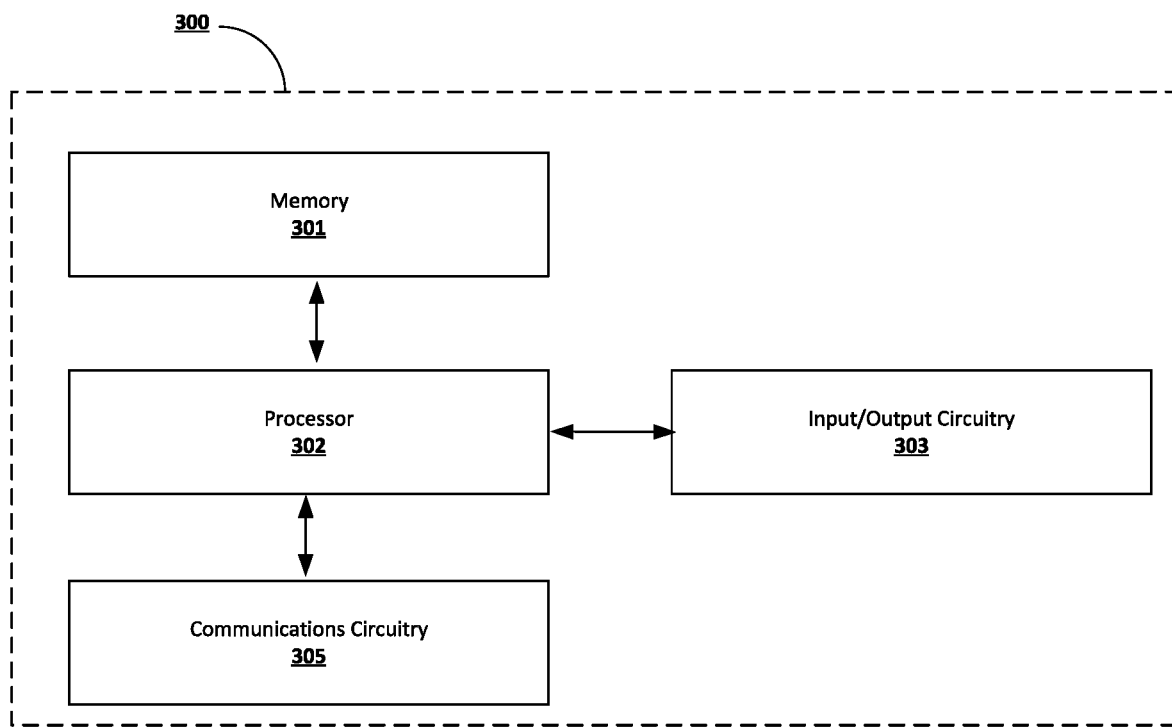

FIG. 3 depicts an exemplary apparatus for a client computing device according to some embodiments of the present disclosure.

Figure 4:
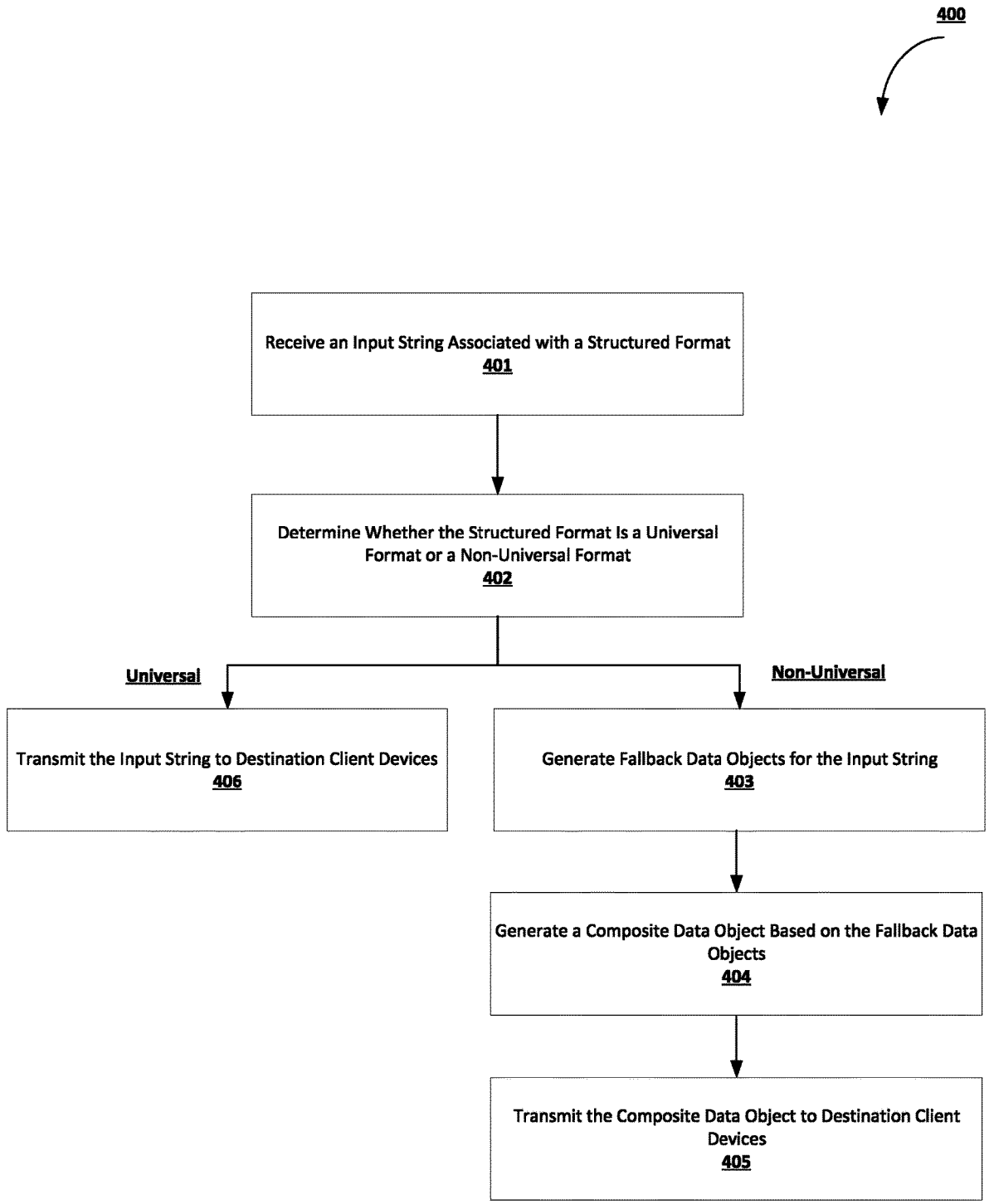

FIG. 4 is a flowchart diagram of an example process for performing format dynamic in a group-based communication system according to some embodiments of the present disclosure.

Figure 5:
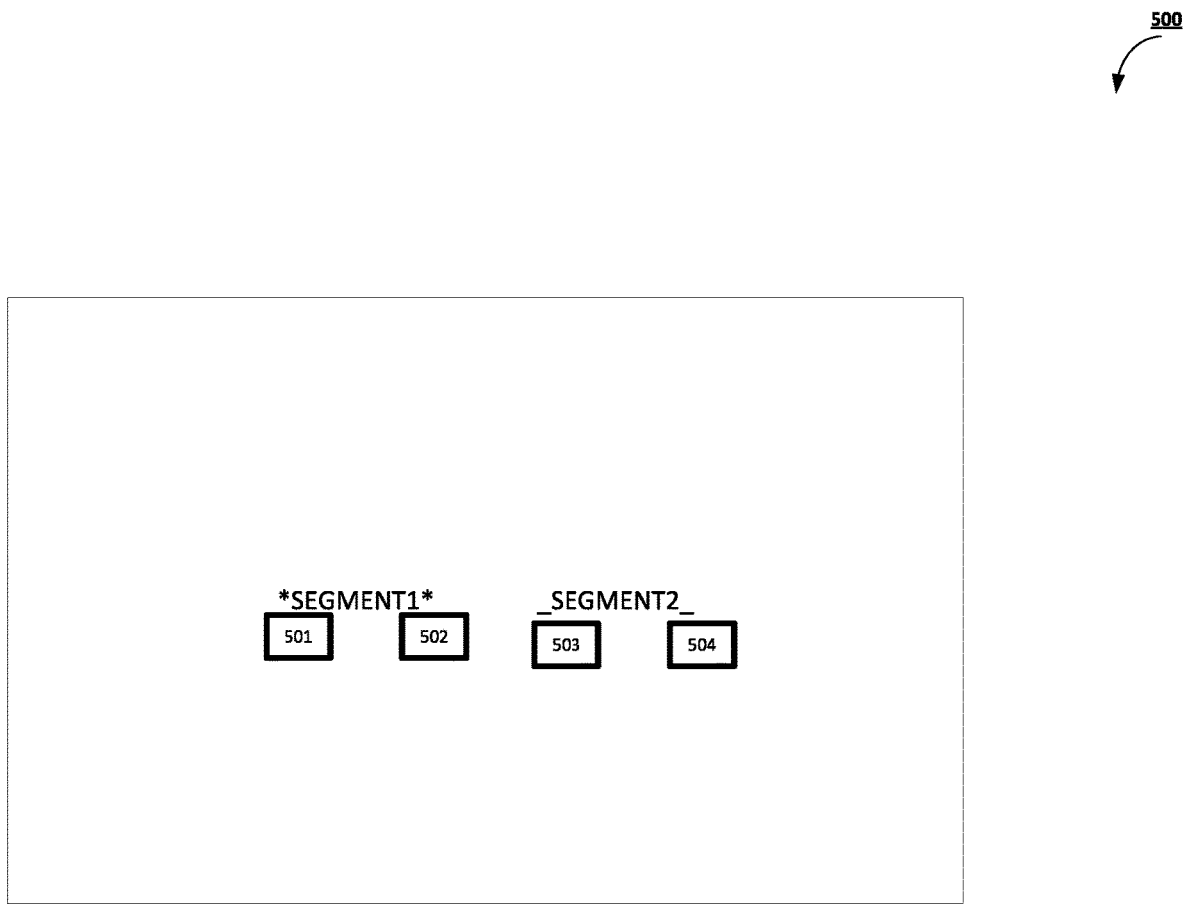

FIG. 5 is an operational example of a marked-up input string according to some embodiments of the present disclosure.

Figure 6:
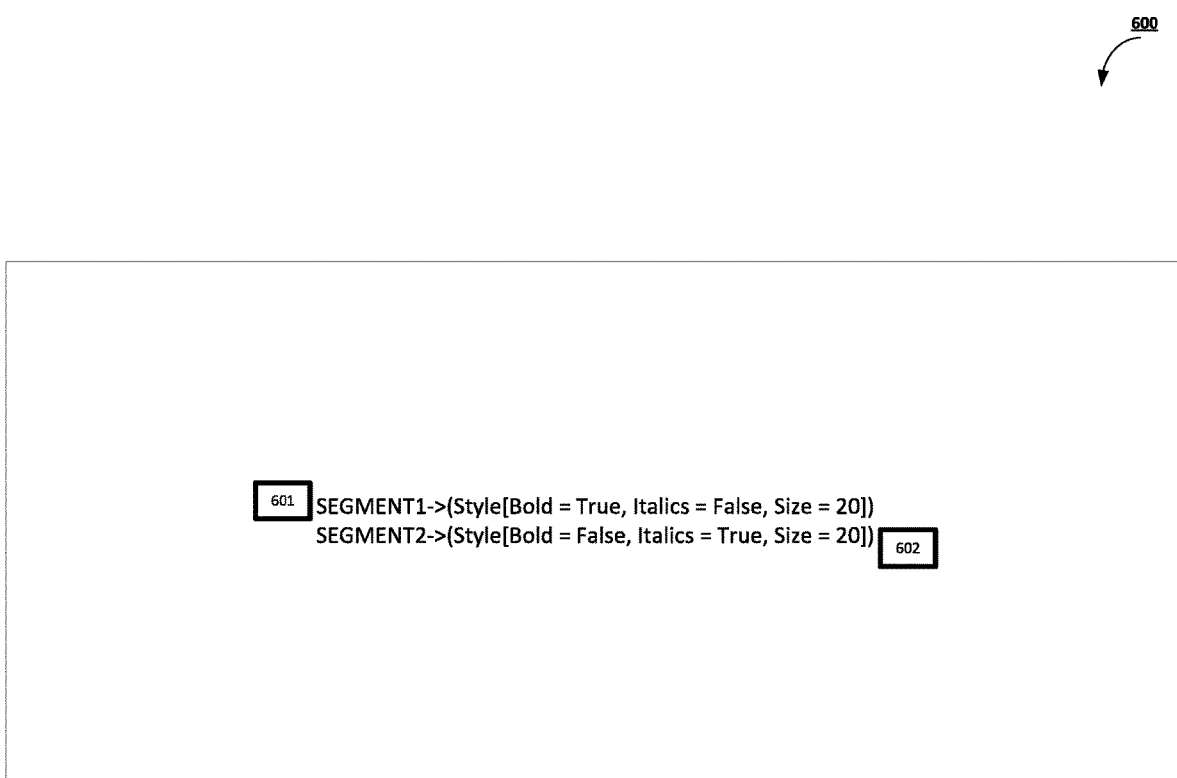

FIG. 6 is an operational example of a feature definition file associated with a serialization-based structured format according to some embodiments of the present disclosure.

Figure 7:

FIG. 7 is an operational example of a displayed text interface according to some embodiments of the present disclosure.

Figure 8:
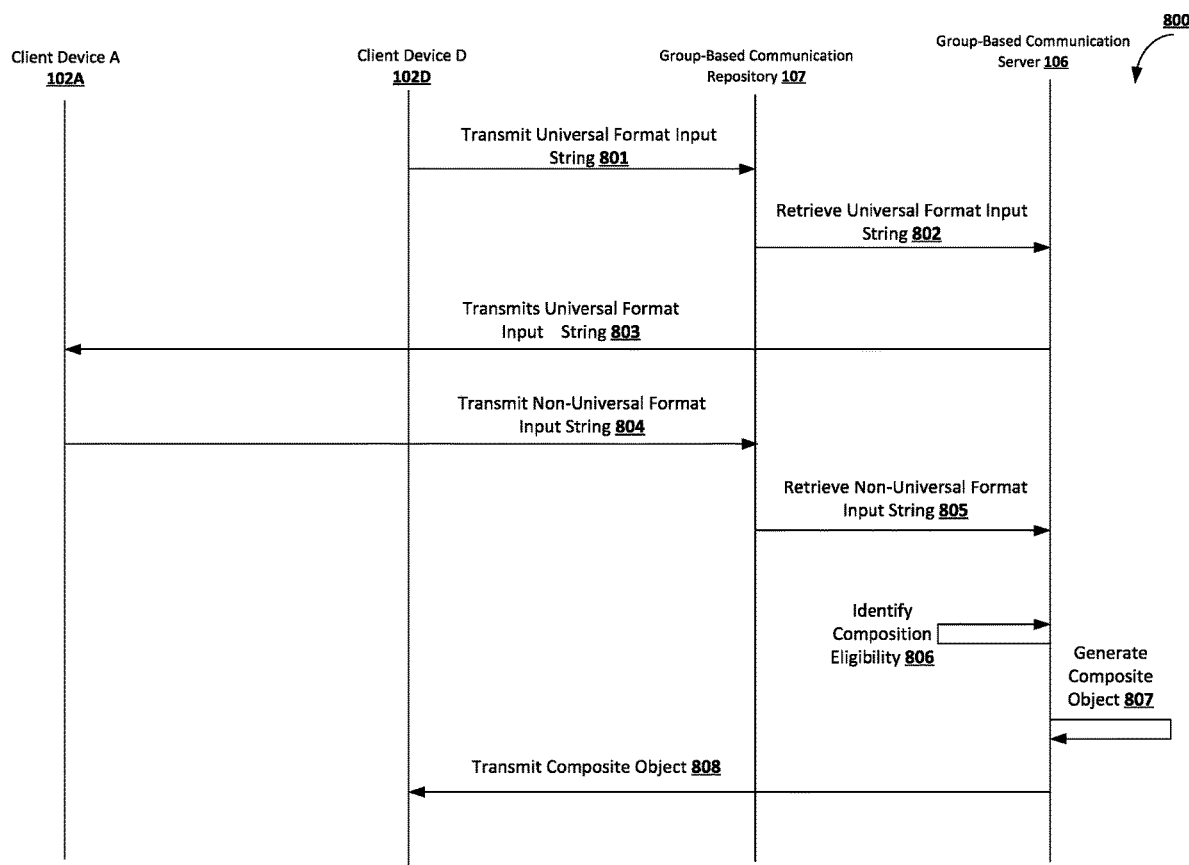

FIG. 8 is a transmission flow diagram of an example process for facilitating formatted data transmission between an updated client device and a non-updated client device according to some embodiments of the present disclosure.

Figure 9:
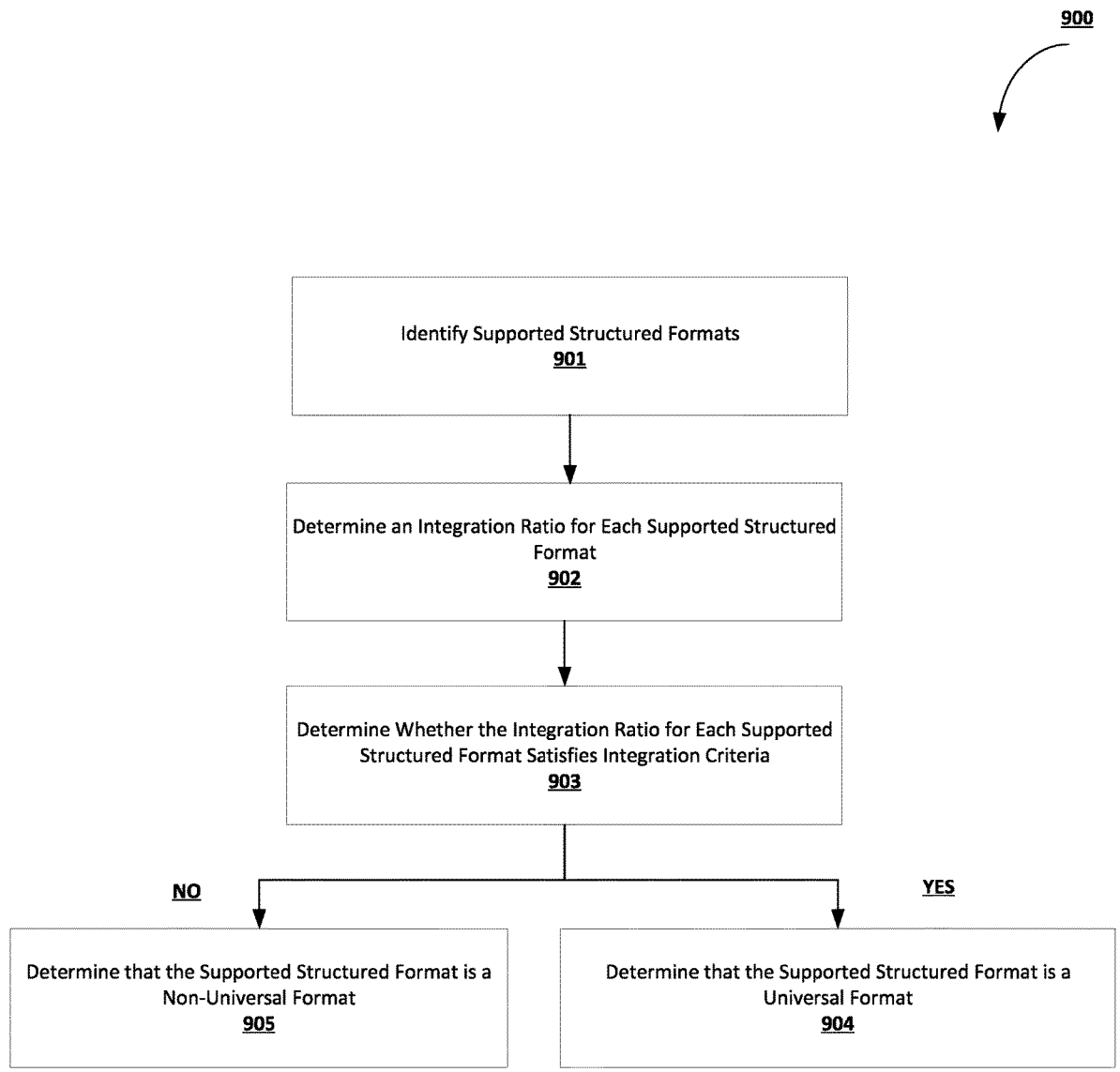

FIG. 9 is a flowchart diagram of an example process for identifying universality of supported structured formats according to some embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third-party developer support that grants appropriate access to the data and allows third parties to build applications and bots to integrate with customer's workflows.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "group-based communication channel data" refers to data items associated with communications between, and files shared by, channel members of a group-based communication channel.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., j doe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise American Standard Code for Information Interchange (ASCII) text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

The term "message communication data" refers to messages exchanged (direct messages (DMs) (e.g., messages sent by users directly to each other instead of through channels), reply messages, forwarded messages, etc.) between an apparatus (e.g., a client device) associated with a user account of a user and one or more other users of the group-based communication platform.

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "format-dynamic message processing" refers to a set of computer-implemented routines that enable modifying a structured format of an input string in accordance with applicable software and/or hardware capabilities of one or more recipient client devices associated with the input string. For example, with respect to an input string associated with a messaging communication, format-dynamic string processing may include, in response to determining that a structured format of an input string is a non-universal format, generating a fallback data object for the input string that includes content data associated with the input string formatted in accordance with one or more universal formats. As another example, format-dynamic string processing may include determining which structured formats are deemed universal and which structured formats are deemed non-universal based on end-user adoption data associated with multiple supported structured formats.

The term "input string" refers to data that includes encodings of a set of characters as well as any formatting data associated with the set of characters. The encoded data associated with an input string may in turn include content data associated with an input string and formatting data associated with an input string. Content data associated with the message communication may include data encoded using one or more text encoding protocols, such as using an American Standard Code for Information Interchange (ASCII) text encoding protocol or a Unicode text encoding protocol. Format data associated with an input string may include data encoded using one or more text feature encoding protocols, such as one or more presentation feature encoding protocols.

The term "source client device" refers to a client device that transmits an input string to a communication server (e.g., a group-based communication server), where the communication server is configured to transmit (e.g., forward) the input string received from the source client device to one or more destination client devices. For example, the source client device may be configured to transmit Transmission Control Protocol (TCP) packets that contain a message communication and the associated message communication data to the communication server, where the communication server is configured to transmit the message communication to one or more destination client devices associated with recipient user profiles identified via the message communication data and based on transmission guidelines identified via the message communication data. In some embodiments, a source client device is a computing device that enables a user profile of a communication system (e.g., a group-based communication system) to communicate with the communicate system and with other user profiles of the communication system via one or more communication interfaces of the communication system.

The term "destination client device" refers to a client device that receives an input string from a communication server, where the input string originates from one or more source client devices. Examples of input strings transmitted between source client devices and destination client devices may include input strings embedded within TCP packets. In some embodiments, a destination client device is a computing device configured to enable a user profile of a communication system (e.g., a group-based communication system) to communicate with the communicate system and with other user profiles of the communication system via one or more communication interfaces of the communication system.

The term "structured format" refers to data that defines feature encoding protocols for defining various features associated with input strings. In some embodiments, a structured format may define protocols for defining and encoding presentation-related features strings. For example, a particular structured format may define markup commands that, when embedded within input strings, enable presentation of particular visualization effects (e.g., bolding visualization effects, italicization visualization effects, underlining visualization effects, color modification visualization effects, size enhancement visualization effects, etc.) with respect to the input strings. As another example, a particular structured format may define serialization commands that, when embedded within format definition data objects associated with input strings, enable presentation of particular visualization effects with respect to the input strings. In some embodiments, a structured format may define protocols for defining non-presentation-related features for input strings in addition to presentation-related features for input strings, such as transmission-related features for input strings, security-related features for input strings, privacy-related features for input strings, etc.

The term "presentation feature encoding protocol" refers to data that defines guidelines for defining presentation-related features for input strings. Examples of presentation feature encoding protocols include markup-based feature encoding protocols and serialization-based feature encoding protocols, as further described below. In some embodiments, presentation-related features for input strings include visualization effects that affect a manner of display of at least a portion of the input strings. Examples of visualization effects include bolding visualization effects, italicization visualization effects, underlining visualization effects, color modification visualization effects, size enhancement visualization effects, etc.

The term "universal format" refers to a structured format determined and/or estimated to have an optimal degree of adoption by user profiles of a communication environment characterized by one or more communication systems. For example, a universal format for a group-based communication system may be a structured format that has been estimated and/or detected to be installed by a threshold share of end users of the group-based communication system. As another example, a universal format for a group-based communication system may be a structured format that has been estimated and/or detected to be used at least once by a threshold share of end users of the group-based communication system. As yet another example, a universal format for a group-based communication system may be a structured format that has been estimated and/or detected to be used on a frequent basis by a threshold share of end users of the group-based communication system. As a further example, a universal format for a group-based communication system may be a structured format that has been released before a particular threshold time interval.

The term "non-universal format" refers to a structured format determined and/or estimated to have a suboptimal degree of adoption by user profiles of a communication environment characterized by one or more communication systems. For example, a non-universal format for a group-based communication system may be a structured format that has been estimated and/or detected to be installed by less than a threshold share of end users of the group-based communication system. As another example, a non-universal format for a group-based communication system may be a structured format that has been estimated and/or detected to be used at least once by less than a threshold share of end users of the group-based communication system. As yet another example, a non-universal format for a group-based communication system may be a structured format that has been estimated and/or detected to be used on a frequent basis by less than a threshold share of end users of the group-based communication system. As a further example, a non-universal format for a group-based communication system may be a structured format that has been released during a particular threshold time interval.

The term "fallback data object" refers to a data object that includes formatting data associated with an input string originally formatted in accordance with a non-universal format, where the formatting data in the fallback data object are generated based on a universal format associated with the fallback data object. In some embodiments, in response to determining that an input string is associated with a non-universal format, a computer system may generate a fallback data object that includes contents of the input string but integrates formatting data associated with the input string generated using a universal format. In some embodiments, the computer system generates the fallback data object as a data object configured to be integrated into a portion of payload of a TCP packet.

The term "composite data object" refers to a data object that includes at least one input string and at least one fallback data object. In some embodiments, the composite data object is configured to be transmitted to one or more destination client devices. In some embodiments, the composite data object is configured to be integrated into payload of a TCP packet. In some embodiments, the composite data object includes markers that indicate which portions of the composite data object include particular input strings and which portions of the composite data object include particular fallback data object. For example, a particular marker may indicate that a particular portion of a particular composite data object include data associated with a Rich Text Format (RTF) fallback data object.

The term "markup-based structured format" refers to a structured format that enables defining input string features by integrating in-line symbols within input strings. For example, a particular markup-based structured format may be characterized by a functionality that enables marking a particular input string data portion as italicized by putting particular alphanumeric character patterns immediately before and after the particular input string data portion.

The term "serialization-based structured format" refers to a structured format that enables defining input string features by supplying feature-definition instructions within feature definition files associated with the input string. For example, a particular serialization-based structured format may enable defining visualization features of input string data portions through generating feature arrays associated with input string data portions (e.g., a feature array in which one feature value represents whether the corresponding input string data portion should be italicized, another feature value represents whether the corresponding input string data portion should be bolded, another feature value represents a desired size of the input string data portion, etc.). An example of a serialization-based structured format is RTF.

The term "structured format integration procedure" refers to a set of computer routines configured to perform software update releases that each include at least one aspect of the functionality of a corresponding structured format, such as at least one of a display-related functionality of the corresponding structured format and a composition-related functionality of a corresponding structured format. For example, a particular structured format integration procedure may include releasing a first software update that includes functionalities related to displaying visual features encoded using a corresponding structured format (i.e., performing a display-related release) before releasing a second software update that includes related to compositing input strings whose formatting data is encoded using the corresponding structured format (i.e., performing a composition-related release). As another example, the particular structured format integration procedure may include releasing performing a display-related release and a composition-related release as part of the same software update release.

The term "integration ratio" refers to data that describes an estimated share of user profiles and/or sufficiently active user profiles a communication system that have integrated functionalities associated with at least one of composing text using the supported structured format and displaying messages associated with the supported text format. In some embodiments, the integration ratio for a supported structured format is determined based on a share of user profiles of the communication system deemed, estimated, and/or detected to have updated their client-side communication system software applications to integrate functionalities related to at least one of composing text using the supported structured format and displaying messages associated with the supported structured format (i.e., based on an updated device ratio associated with the corresponding supported structured format).

The term "integration threshold criteria" refers to data that define a level of integration ratio whose achievement by a supported structured format suggests near-universal adaptation of a corresponding supported structured format by user profiles and/or sufficiently active user profiles of a communication system. For example, a particular integration threshold criterion may define that any supported structured format adopted by eighty percent of user profiles of a communication system should be deemed to be a universal format.

Overview

Various embodiments of the present disclosure address technical challenges related to efficiency and reliability of string processing in communication systems, especially with respect to performing string processing with respect to performing string processing in broadcast communication contexts. String data transmitted in communication systems typically include formatting data that define various properties of encoded alphanumeric data included in input strings. Such formatting data are encoded using particular structured formats that define protocols for encoding formatting features related to input strings. The diversity of structured formats can create challenges for communication systems because different client-side communication system software applications may be capable of decoding and interpreting different structured formats.

For example, a recent software update release of a client-side communication system software application may enable user profiles to display and/or compose text data formatted using RTF, but not all client devices might have successfully downloaded and installed the recent software update release. As a result, some user profiles may be able to input string data formatted in accordance with structured formats that cannot be decoded by client-side communication system software applications of other user profiles. The resulting interoperability challenges may create a huge disincentive against deploying new structured formats in software update releases despite efficiency, reliability, and user-friendliness of the noted new structured formats.

Moreover, the described interoperability challenges associated with the diversity of structured formats across various client devices may force communication system servers to perform complex and computationally intensive operations intended to enable a reliable degree of string format interoperability across diverse formatting regimes. In one example, the communication servers may be forced to maintain substantial amounts of data about string formatting capabilities of various client devices and perform complex format conversion operations to accommodate the formatting requirements of the various client devices. Such data-intensive and computationally costly operations are even more critical and detrimental for communication systems that perform a considerable amount of broadcast operations, such as group-based communication systems that transmit group-based communication messages to entire sets of user profiles associated with particular group-based communication channels and/or various group-based communication interfaces. In the broadcast communication context, communication system servers often resort retrieving substantial amounts of configuration data for a large number of associated destination client devices and performing a substantial number of computationally costly format conversion routines.

To address the described technical challenges related to efficiency and reliability of string processing in communication systems, various embodiments of the present disclosure introduce concepts that enable format-dynamic string processing in communication systems. For example, in some embodiments, a communication system server determines a structured format associated with a string input, determines whether the structured format is a universal format of one or more universal formats associated with the communication system or a non-universal format of one or more non-universal formats associated with the communication system. In response to determining that the structured format is a non-universal format of the one or more non-universal formats, the generates, based on the input string, one or more fallback data objects associated with the input string, wherein each of the one or more fallbacks is associated with a respective universal format of at least one of the one or more universal formats; generates a composite data object based on the input string and each of the one or more fallback data objects; and transmits the composite data object to each destination client device of one or more destination client devices.

Through utilizing the above-described format-dynamic string processing concepts and similar concepts described herein, various embodiments of the present disclosure perform inter-format string processing through a number of computationally efficient operations based on predefined format generation models. This has many technical advantages over existing string processing solutions. For example, by performing format modifications only when an input string has a non-universal format, the introduced techniques reduce the need for performing format processing to only those instances where structured formats having limited cross-user adaption are used in input strings. In addition, by performing format modifications based on universality of utilized structured formats as opposed to data about formatting capabilities of individual client devices, the introduced techniques can eliminate the storage costs associated with maintaining formatting capability records as well as the processing costs associated with monitoring client device formatting capabilities. Furthermore, by generating composite messages that are deemed interpretable by all client devices associated with a communication system, the introduced techniques can eliminate the need for generating recipient-specific message objects and thus greatly reduce computational complexity and storage costs associated with performing broadcast operations in communication systems. Moreover, by providing techniques for performing efficient and reliable format adjustment in communication systems, the introduced solutions enhance the capability of communication systems to provide rich text editing experiences and thus facilitate adoption of such communication systems in enterprise applications and business solutions.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example architecture 100 for performing various embodiments of the present disclosure may operate. Users may access a group-based communication system 105 via a communications network (not shown) using one or more client computing devices, such as client computing devices 102A-102F. The group-based communication system 105 may comprise a group-based communication server 106 in communication with at least one group-based communication repository 107.

Communications network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC ("remote procedural call), JSON over REST("Representational State Transfer")/HTTP ("HyperText Transfer Protocol"), and the like.

The client devices 102A-102F may enable user profiles of the group-based communication system 105 to utilize one or more functionalities provided by the group-based communication system 105, such as one or more string processing functionalities provided by the group-based communication system 105. Each client device 102A-F maintain a local client-side group-based communication application associated with the group-based communication system 105. The client devices 102A-102F may include updated client devices 102A-C whose corresponding local client-side group-based communication software applications include functionalities related to both universal structured formats associated with the group-based communication system 105 and non-universal structured formats associated with the group-based communication system 105, and updated client devices 102D-F whose corresponding local client-side group-based communication software applications include functionalities related only to non-universal structured formats associated with the group-based communication system.

The group-based communication server 106 may be embodied as a computer or computers. The group-based communication server 106 may provide for receiving of electronic data from various sources, including but not necessarily limited to the client computing devices 102A-102F. For example, the group-based communication server 106 may be operable to receive and post or transmit group-based messaging communications provided by the client computing devices 102A-102F.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client computing devices 102A-102F may be any computing device as defined above. Electronic data received by the group-based communication server 106 from the client computing devices 102A-102F may be provided in various forms and via various methods. For example, the client computing devices 102A-102F may include desktop computers, laptop computers, smartphones, netbooks, tablet computers, wearables, and the like. In embodiments where a client computing device 102A-102F is a mobile device, such as a smartphone or tablet, the client computing device 102A-102F may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. Additionally or alternatively, the client computing device 102A-F may interact with the group-based communication system 105 via a web browser. As yet another example, the client computing device 102A-102F may include various hardware or firmware designed to interface with the group-based communication system 105.

In some embodiments of an exemplary group-based communication system 105, a message or messaging communication may be sent from a client computing device 102A-102F to a group-based communication system 105. In various implementations, the message may be sent to the group-based communication system 105 over communications network 104 directly by a client computing device 102A-102F, the message may be sent to the group-based communication system 105 via an intermediary such as a message server, and/or the like. For example, the client computing device 102A-102F may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client computing device 102A-102F may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23 :59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details>//iOS Client with App and Webkit
        //it should be noted that although several client details
        //sections are provided to show example variants of client
        //sources, further messages will include only on to save
        //space
        <client_IP>10.0.0.123</client_P>
        <user_agent_string>Mozilla/5.0 (iPhone; CPU iPhone OS 7_1_1
like Mac OS X) AppleWebKit/537.51.2 (KHTML, like Gecko) Version/7.0
Mobile/11D201 Safari/9537.53</user_agent_string>
        <client_product_type>iPhone6,1</client_product_type>
        <client_serial_numb er>DNXXX1X1XXXX</client_serial_number>
        <client_UDID>3XXXXXXXXXXXXXXXXXXXXXXXD
</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details>//iOS Client with Webbrowser
        <client_IP>10.0.0.123</client_IP>
        <user_agent_string>Mozilla/5.0 (iPhone; CPU iPhone OS 7_1_1
like Mac OS X) AppleWebKit/537.51.2 (KHTML, like Gecko) Version/7.0
Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXD
</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details>//Android Client with Webbrowser
        <client_IP>10.0.0.123</client_IP>
        <user_agent_string>Mozilla/5.0 (Linux; U; Android 4.0.4; en-us;
Nexus S Build/IMM76D) AppleWebKit/534.30 (KHTML, like Gecko)
Version/4.0 Mobile Safari/534.30</user_agent_string>
        <client_product_type>Nexus S</client_product_type>
        <client_serial number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details>//Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting disclosure. I have attached a
copy our patent policy.</contents>
        <attachments>patent_policy.pdf</attachments>
    </message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

```
POST/storage_message.php HTTP/1.1
Host: www.server.com
Content-Type: Application/XML
Content-Length: 667
<?XML version="1.0" encoding="UTF-8"?>
<storage_message>
    <message_identifier>ID message 10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting disclosure. I have
attached a copy our patent
policy.</contents>
    <attachments>patent_policy.pdf</attachments>
    <conversation_primitive>
``` conversation includes messages: ID_message 8, ID_message 9, ID_message 10, ID_message 11, ID_message 12
</conversation_primitive>
</storage_message>

In embodiments, a group identifier as defined above may be associated with the message. In embodiments, a group-based communication channel identifier as defined above may be associated with the message. In embodiments, a sending user identifier as defined above may be associated with the message. In one implementation, the message may be parsed (e.g., using PHP—i.e. the script language derived from Personal Home Page Tools—commands) to determine a sending user identifier of the user who sent the message. In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message. In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The group-based communication server 106 may be embodied by one or more computing systems, such as apparatus 200 shown in FIG. 2. The apparatus 200 may include a processor 202, a memory 201, input/output circuitry 203, communications circuitry 205, and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As just one example, the processor 202 may be configured to maintain one or more communication channels connecting a plurality of client computing devices 102A-102F to enable message sharing therebetween. The processor 202 ensures that messages intended for exchange between the client computing devices 102A-102F within the particular communication channel are properly disseminated to those client computing devices 102A-102F for display within respective display windows provided via the client computing devices 102A-102F.

Moreover, the processor 202 may be configured to synchronize messages exchanged on a particular communication channel with a database for storage and/or indexing of messages therein. In certain embodiments, the processor 202 may provide stored and/or indexed messages for dissemination to client computing devices 102A-102F.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client computing device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Client Computing Device Overview

A client computing device 102A-102F may include one or more computing systems, such as the apparatus 300 shown in FIG. 3. The apparatus 300 may include a processor 302, a memory 301, input/output circuitry 303, and communications circuitry 305. The apparatus 300 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 302 may provide processing functionality, the memory 301 may provide storage functionality, the communications circuitry 305 may provide network interface functionality, and the like.

In some embodiments, the processor 302 (and/or co-processor or any other processing circuitry assisting or otherwise associated with the processor) may be in communication with the memory 301 via a bus for passing information among components of the apparatus. The memory 301 may be non-transitory and may include, for example, one or more volatile and/or non-volatile memories. In other words, for example, the memory may be an electronic storage device (e.g., a computer readable storage medium). The memory 301 may be configured to store information, data, content, applications, instructions, or the like, for enabling the apparatus 300 to carry out various functions in accordance with example embodiments of the present disclosure.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 301 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include input/output circuitry 303 that may, in turn, be in communication with processor 302 to provide output to the user and, in some embodiments, to receive an indication of a user input. The input/output circuitry 303 may comprise a user interface and may include a display and may comprise a web user interface, a mobile application, a client computing device, a kiosk, or the like. In some embodiments, the input/output circuitry 303 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 301, and/or the like).

The communications circuitry 305 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 305 may include, for example, a network interface for enabling communications with a wired or wireless communication network. For example, the communications circuitry 305 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Exemplary System Operations

FIG. 4 is a flowchart diagram of an example process 400 for performing format-dynamic string processing in a communication system. Via the various operations of process 400, a communication server can perform string processing in a manner that reduces operational costs associated with lack of text formatting interoperability across client devices interacting with the communication server. While various embodiments of process 400 are described herein with reference to a group-based communication server 106 of a group-based communication system 105, a person of ordinary skill in the relevant technology will recognize that the disclosed techniques can be utilized for format-dynamic string processing in non-group-based communication systems as well as in systems other than communication systems, such as in document repository systems and in collaborative work environment systems.

The process 400 begins at operation 401 when the group-based communication server 106 receives an input string from a source client device 102A-F, where the input string may include data that indicates that the input string is intended to be communicated to one or more destination client devices 102A-F associated with the group-based communication system 105. The input string may include encoded data associated with a message communication intended to be communicated to one or more destination user profiles of the group-based communication system 105. The encoded data associated with a message communication may in turn include content data associated with the message communication and formatting data associated with the message communication. Content data associated with the message communication may include data encoded using one or more text encoding protocols, such as using ASCII text encoding protocol or a Unicode text encoding protocol. Format data associated with the message communication may include data encoded using one or more text feature encoding protocols, such as one or more presentation feature encoding protocols.

In some embodiments, the input string may include data associated with a broadcast message. For example, an input string associated with a group-based communication message transmitted to a group-based communication channel may be a broadcast message, as a group-based communication message transmitted to a group-based communication channel is typically intended to be transmitted to every group-based communication profile associated with the group-based communication channel. In some embodiments, the input string may include data associated with a non-broadcast message targeted to a particular group-based communication profile. For example, an input string associated with a private message may be a non-broadcast message targeted to a particular group-based communication profile, as a private message is typically intended to be transmitted to identified recipient profiles.

In some embodiments, the input string is part of one or more input data packets that include, in addition to the input string, information about one or more operational properties of the source client device associated with the input string and/or one or more operational properties of at least one of the one or more destination client devices associated with the input string. In some embodiments, the input data packets include authentication information associated with a sending user profile of the group-based communication system 105 that enable the source client device to interact with the group-based communication system 105 on behalf of the sending user profile. In some embodiments, the input data packets include authorization information associated with the destination user profile of the group-based communication system 105 that enable the source computing device to cause transmission of intended message data to one or more intended recipient user profiles of the group-based communication system 105.

In some embodiments, the input string is associated with a structured format, where the structured format may define one or more presentation feature encoding protocols associated with the input string. In some embodiments, a presentation feature encoding protocol defines guidelines for defining presentation-related features for one or more input strings. Examples of presentation feature encoding protocols include markup-based feature encoding protocols and serialization-based feature encoding protocols, as further described below. In some embodiments, presentation-related features for input strings include visualization effects that affect a manner of display of at least a portion of the input strings. Examples of visualization effects include bolding visualization effects, italicization visualization effects, underlining visualization effects, color modification visualization effects, size enhancement visualization effects, etc.

In some embodiments, the presentation feature encoding protocols by the structured format include a markup-based structured format. In some embodiments, a markup-based structured format enables defining input string features by integrating in-line symbols within input strings. For example, a markup-based structured format may be characterized by a functionality that enables italicizing a particular input text string data portion by putting particular alphanumeric character patterns immediately before and after the particular input text string data portion. An operational example of a marked-up input string 500 is presented in FIG. 5. The exemplary marked-up input string 500 includes in-line symbols 501-504 that define input string features for different segments of the marked-up input string 500.

As depicted in in FIG. 5, SEGMENT1 of the marked-up input string 500 is immediately preceded and followed by the in-line symbols 501-502. As further depicted in in FIG. 5, SEGMENT2 of the marked-up input string 500 is immediately preceded and followed by the in-line symbols 503-504. In some embodiments, processing the marked-up input string 500 in accordance with the applicable presentation feature encoding protocol may lead to generating the displayed text interface 700 of FIG. 7, in which SEGMENT 1 of the marked-up input string 500 is bolded and SEGMENT2 of the marked-up input string 500 is italicized.

In some embodiments, the presentation feature encoding protocols by the structured format include a serialization-based structured format. In some embodiments, a serialization-based structured format enables defining features by supplying feature-definition instructions within feature definition files associated with the input string. For example, a particular serialization-based structured format may enable defining visualization features for particular input string portions through providing feature arrays associated with input string data portions (e.g., a feature array in which one feature value represents whether the corresponding input string data portion should be italicized, another feature value represents whether the corresponding input string data portion should be bolded, another feature value represents a desired size of the input string data portion, etc.).

An operational example of a feature definition file 600 associated with the serialization-based structured format is presented in FIG. 6. The exemplary feature definition file 600 includes a feature array 601-602 for each formatted segment of an associated input string, where each feature array 601-602 defines a bolding visualization feature value for the input string segment associated with the feature array 601-602, an italicizing visualization feature value for the input string segment associated with the feature array 601-602, and a size visualization feature value for the input string segment associated with the feature array 601-602. In particular, as depicted in FIG. 6, SEGMENT1 of the feature definition file 600 is associated with a feature array 601 which defines SEGMENT1 as being bolded, not italicized, and with a size of 20 points, while SEGMENT2 of the feature definition file 600 is associated with a feature array 602 which defines SEGMENT2 as being italicized, not bolded, and with a size of 20 points. In some embodiments, processing an associated input string in accordance with the feature definition file 600 may lead to generating the displayed text interface 700 of FIG. 7, in which SEGMENT 1 of the input string is bolded and SEGMENT2 of the input string is italicized.

Returning to FIG. 4, at operation 402, the group-based communication server 106 determines whether the structured format associated with the input string is a universal format or a non-universal format. In some embodiments, a universal format is a structured format determined to have an optimal degree of adoption by user profiles of a communication environment characterized by one or more communication systems, while a non-universal format is a structured format determined and/or estimated to have a suboptimal degree of adoption by user profiles of a communication environment characterized by one or more communication systems. In some embodiments, determining whether a particular structured format is performed based on one or more integration indicia associated with the structured format, where integration indicia for a particular structured format indicate properties of the structured format that are deemed related to an estimated degree of integration of the structured format among the user profiles of the group-based communication system.

For example, a universal format for a group-based communication system may be a structured format that has been estimated and/or detected to be installed by a threshold share of end users of the group-based communication system. As another example, a universal format for a group-based communication system may be a structured format that has been estimated and/or detected to be used at least once by a threshold share of end users of the group-based communication system. As yet another example, a universal format for a group-based communication system may be a structured format that has been estimated and/or detected to be used on a frequent basis by a threshold share of end users of the group-based communication system. As a further example, a universal format for a group-based communication system may be a structured format that has been released before a particular threshold time interval.

In some embodiments, the one or more universal formats and the one or more non-universal formats are defined with respect to a structured format integration procedure, where the structured format integration procedure may include a plurality of software update releases associated with the communication system, the plurality of software update releases include one or more display-related update releases and one or more composition-related update releases, and the one or more display-related update releases are performed prior to the one or more composition-related update releases. In some embodiments, when releasing software updates that relate to a particular structured format (e.g., a newly deployed structured format), software update releases that enable displaying visualization features encoded in accordance with the structured format are prioritized over software update releases that enable encoding visualization features encoded in accordance with the structured format.

In some embodiments, identifying universality of supported structured formats is performed in accordance with the process 900 depicted in the flowchart diagram of FIG. 9. As depicted in FIG. 9, the process 900 begins at operation 901 when the group-based communication server 106 identifies one or more supported text formats associated with the group-based communication system 105. At operation 902, the group-based communication server 106 determines an integration ratio for each supported text format. In some embodiments, an integration ratio for a supported structured format indicates an estimated share of user profiles and/or sufficiently active user profiles associated with the group-based communication system 105 that are determined and/or detected to have integrated functionalities associated with at least one of composing text using the supported structured format and displaying messages associated with the supported text format. In some embodiments, the integration ratio for the supported structured format is determined based on an updated device ratio for a software update release associated with the supported structured format (e.g., the software update release in which functionalities associated with at least one of composing text using the supported structured format and displaying messages associated with the supported structured format are integrated into a client-side software application for the group-based communication system 105).

At operation 903, the group-based communication server 106 determines whether the integration ratio satisfies one or more integration threshold criteria. In some embodiments, the integration threshold criteria define a level of integration ratio whose achievement by a supported structured format suggests near-universal adaptation of the supported structured format by user profiles and/or sufficiently active user profiles of the group-based communication system 105. At operation 904, in response to a determining that the integration ratio for a particular supported structured format satisfies the one or more integration threshold criteria, the group-based communication server 106 determines that the particular supported structured format is a universal format. At operation 905, in response to determining that the integration ratio for a particular supported structured format fails to satisfy the one or more integration threshold criteria, the group-based communication server 106 determines that the particular supported structured format is a non-universal format.

Returning to FIG. 4, in response to determining that the determined structured format of the input string is a non-universal format, the group-based communication system performs operations 403-405. At operation 403, the group-based communication server 106 generates, based on the input string, one or more fallback data objects associated with the input string, where each of the one or more fallbacks is associated with a respective universal format of at least one of the one or more universal formats. In some embodiments, to generate a fallback data object for an input string, the group-based communication server 106 generates data that includes formatting information of the input string encoded in accordance with a universal format associated with the fallback data object.

For example, if an input string is associated with a non-universal format that is a serialization-based structured format, the group-based communication system 106 may generate a fallback data object associated with a universal format that is a markup-based structured format by encoding formatting information in a feature definition file for the input string as in-line symbols within the input string. As another example, if an input string is associated with a non-universal format that is a markup-based structured format, the group-based communication system 106 may generate a fallback data object associated with a universal format that is a serialization-based structured format by encoding formatting information encoded as in-line symbols of the input string as feature-definition instructions (e.g., feature array definitions) within a feature definition. Accordingly, in some embodiments, the group-based communication server 106 may convert the structured format of an input string with a non-universal format to a universal format. For example, the group-based communication server 106 may identify that RTF has not achieved sufficient adaptation by user profiles of the group-based communication server 106 and thus convert an input string formatted in accordance with RTF into a universal format for the group-based communication system 105.

At operation 404, the group-based communication server 106 generates a composite data object based on the input string and each of the one or more fallback data objects. In some embodiments, the composite data object is a data object that includes content data associated with the input string as well as formatting data associated with the input string, where the formatting data associated with the input string includes formatting data associated with each fallback data object (e.g., formatting data associated with each universal structured format for the group-based communication system 105). In some embodiments, the formatting data associated with the input string configured to be included in the composite data object also includes original formatting data of the input string, i.e., formatting data of the input string extracted from the input string and/or formatting data of the input string defined in accordance with the structured format of the input string.

In some embodiments, the group-based communication server 106 may determine that no supported structured format associated with the group-based communication system 105 is a universal format and that all supported structured formats associated with the group-based communication system 105 are non-universal. In some of those embodiments, in response to the noted determination, the group-based communication server 106 may identify a collection of supported structured formats whose collective adaption by the user profiles of the group-based communication system 105 exceeds an adaptation threshold and/or whose collective integration by user profiles of the group-based communication system 105 exceeds an integration threshold. The group-based communication server 106 may then generate a composite data object that includes formatting data for the input string in accordance with each supported structured format in the collection of supported structured formats.

In some embodiments, the composite data object may include formatting data for the input string generated in accordance with each structured format determined to be most efficiently interpretable and/or most efficiently displayable on a client device of a destination client device associated with the input string. In some embodiments, the structured formats determined to be most efficiently interpretable and/or most efficiently displayable on a particular destination client device may be determined based on past operational data and/or past performance data monitored and recorded for the destination client device.

At operation 405, the group-based communication server 106 transmits the generated composite data to each destination client device associated with the input string. In contrast, at operation 406, in response to determining that the determined structured format of the input string is a universal format, the group-based communication server 106 transmits the input string to each destination client device associated with the input string. In some embodiments, depending on universality of the determined structured format for the input string, the group-based communication server 106 may forward the input string in a non-converted format or may first convert the format of the input string before transmission of message data associated with the input string. In some embodiments, transmission of data between the source client device and the destination client devices is performed as part of formatted data transmissions between one or more updated client devices and one or more non-updated client devices.

FIG. 8 is a transmission flow diagram of an example process 800 for facilitating formatted data transmission between an example updated client device (e.g., updated client device A 102A) and an example non-updated client device (e.g., non-updated client device D 102D). As depicted in FIG. 8, when the non-updated client device D 102D transmits a universal format input string having a universal format to the group-based communication repository 107 at operation 801, the group-based communication system 106 retrieves the universal format input string from the group-based communication repository 107 at operation 802 and transmits (e.g., forwards) the retrieved universal format input string to the intended destination device (i.e., the updated client device A 102A) at operation 803.

However, when the updated client device A transmits a non-universal format input string having a non-universal format to the group-based communication repository 107 at operation 804, the group-based communication system 106 retrieves the non-universal format input string from the group-based communication repository 107 at operation 805, identifies the composition eligibility of the non-universal format input string (e.g., identifies that the non-universal format input string is associated with a destination device estimated to be a non-updated device and/or identifies that the non-universal format input string is associated with a broadcast message) at operation 806, generates a composite object for the retrieved non-universal format input string at operation 807, and transmits the composite object to the intended destination device (i.e., the non-updated client device D 102D) at operation 808. In some embodiments, process 800 may be utilized to enable real-time and/or non-real-time communications between client devices of diverse software update history designations.

Additional Example Implementation Details

Although example processing systems have been described in FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs (i.e., one or more modules of computer program instructions) encoded on computer-readable storage medium for execution by, or to control the operation of, information/data processing apparatus. Alternatively, or in addition, the program instructions can be encoded on an artificially-generated propagated command (e.g., a machine-generated electrical, optical, or electromagnetic command) which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated command, a computer-readable storage medium can be a source or destination of computer program instructions encoded in an artificially-generated propagated command. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (Application Specific Integrated Circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data (e.g., magnetic, magneto-optical disks, or optical disks). However, a computer need not have such devices. Devices suitable for storing computer program instructions and information/data include all forms of non-volatile memory, media and memory devices, including by way of example semiconductor memory devices (e.g., EPROM, EEPROM, and flash memory devices; magnetic disks, such as internal hard disks or removable disks; magneto-optical disks; and CD-ROM and DVD-ROM disks). The processor and the memory can be supplemented by, or incorporated in, special purpose logic circuitry.

To provide for interaction with a user, embodiments of the subject matter described herein can be implemented on a computer having a display device (e.g., a CRT (cathode ray tube) or LCD (liquid crystal display) monitor) for displaying information/data to the user and a keyboard and a pointing device (e.g., a mouse or a trackball, by which the user can provide input to the computer). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, or tactile input). In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component (e.g., as an information/data server), or that includes a middleware component (e.g., an application server), or that includes a front-end component (e.g., a client device having a graphical user interface or a web browser through which a user can interact with an implementation of the subject matter described herein), or any combination of one or more such back-end, middleware, or front-end components. The components of the system can be interconnected by any form or medium of digital information/data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

Conclusion

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for performing format-dynamic string processing in a communication system, the apparatus comprising at least one processor and at least one memory comprising a computer program code, the at least one memory and the computer program code configured to, with the at least one processor, cause the apparatus to:
    identify one or more universal formats and one or more non-universal formats associated with the communication system, wherein identifying the one or more universal formats and the one or more non-universal formats comprises:
    for each supported structured format associated with the communication system: determining an integration condition associated with the supported structured format; determining whether the integration condition satisfies one or more thresholds; and
    in response to determining that the integration condition satisfies the one or more thresholds, determining that the supported structured format is one of the one or more universal formats; and
    in response to determining that the integration condition fails to satisfy the one or more thresholds, determining that the supported structured format is one of the one or more non-universal formats:
    receive, from a source client device associated with the communication system, an input string, wherein the input string is associated with a structured format;
    determine whether the structured format is a universal format of the one or more universal formats or a non-universal format of the one or more non-universal formats; and
    in response to determining that the structured format is a non-universal format of the one or more non-universal formats:
    generate, based on the input string, one or more fallback data objects associated with the input string, wherein each of the one or more fallback data objects is associated with a respective universal format of the one or more universal formats;
    generate a composite data object based on the input string and each of the one or more fallback data objects; and
    transmit the composite data object to each destination client device of one or more destination client devices.

2. The apparatus of claim 1, wherein the at least one memory and the computer program code are further configured to, with the at least one processor, cause the apparatus to:
    in response to determining that the structured format is a universal format of the one or more universal formats, transmitting the input string to each destination client device of one or more destination client devices.

3. The apparatus of claim 1, wherein the one or more universal formats comprise a markup-based structured format.

4. The apparatus of claim 1, wherein the one or more non-universal formats comprise a serialization-based structured format.

5. The apparatus of claim 4, wherein the serialization-based structured format is a Rich Structured format (RTF).

6. The apparatus of claim 1, wherein the communication system is a group-based communication system.

7. The apparatus of claim 1, wherein:
the one or more universal formats and the one or more non-universal formats are defined with respect to a structured format integration procedure,
the structured format integration procedure comprises a plurality of software update releases associated with the communication system,
the plurality of software update releases comprises one or more display-related update releases and one or more composition-related update releases, and
the one or more display-related update releases are performed prior to the one or more composition-related update releases.

8. The apparatus of claim 1, wherein the integration condition comprises an integration ratio for the supported structured format, and wherein the integration ratio is determined based on an updated device ratio for a software update release associated with the supported structured format.

9. The apparatus of claim 1, wherein the structured format indicates one or more presentation feature encoding protocols associated with the input string.

10. A computer-implemented method for performing format-dynamic string processing in a communication system, the method comprising:
identifying one or more universal formats and one or more non-universal formats associated with the communication system, wherein identifying the one or more universal formats and the one or more non-universal formats comprises:
for each supported structured format associated with the communication system: determining an integration condition associated with the supported structured format; determining whether the integration condition satisfies one or more thresholds; and
in response to determining that the integration condition satisfies the one or more thresholds, determining that the supported structured format is one of the one or more universal formats; and
in response to determining that the integration condition fails to satisfy the one or more thresholds, determining that the supported structured format is one of the one or more non-universal formats;
receiving, from a source client device associated with the communication system, an input string, wherein the input string is associated with a structured format;
determining whether the structured format is a universal format of the one or more universal formats or a non-universal format of the one or more non-universal formats; and
in response to determining that the structured format is a non-universal format of the one or more non-universal formats:
generating, based on the input string, one or more fallback data objects associated with the input string, wherein each of the one or more fallback data objects is associated with a respective universal format of the one or more universal formats;
generating a composite data object based on the input string and each of the one or more fallback data objects; and
transmitting the composite data object to each destination client device of one or more destination client devices.

11. The computer-implemented method of claim 10, further comprising:
in response to determining that the structured format is a universal format of the one or more universal formats, transmitting the input string to each destination client device of one or more destination client devices.

12. The computer-implemented method of claim 10, wherein the one or more universal formats comprise a markup-based structured format.

13. The computer-implemented method of claim 10, wherein the one or more non-universal formats comprise a serialization-based structured format.

14. The computer-implemented method of claim 13, wherein the serialization-based structured format is a Rich Structured format (RTF).

15. The computer-implemented method of claim 10, wherein:
the one or more universal formats and the one or more non-universal formats are defined with respect to a structured format integration procedure,
the structured format integration procedure comprises a plurality of software update releases associated with the communication system,
the plurality of software update releases comprises one or more display-related update releases and one or more composition-related update releases, and
the one or more display-related update releases are performed prior to the one or more composition-related update releases.

16. The computer-implemented method of claim 10, wherein the integration condition comprises an integration ratio for the supported structured format, and wherein the integration ratio is determined based on an updated device ratio for a software update release associated with the supported structured format.

17. A non-transitory computer storage medium comprising instructions for performing format-dynamic string processing in a communication system, the instructions being configured to cause one or more processors to at least perform operations configured to:
identify one or more universal formats and one or more non-universal formats associated with the communication system, wherein identifying the one or more universal formats and the one or more non-universal formats comprises:
for each supported structured format associated with the communication system: determining an integration condition associated with the supported structured format; determining whether the integration condition satisfies one or more thresholds; and
in response to determining that the integration condition satisfies the one or more thresholds, determining that the supported structured format is one of the one or more universal formats; and
in response to determining that the integration condition fails to satisfy the one or more thresholds, determining that the supported structured format is one of the one or more non-universal formats;

receive, from a source client device associated with the communication system, an input string, wherein the input string is associated with a structured format;

determine whether the structured format is a universal format of the one or more universal formats or a non-universal format of the one or more non-universal formats; and in response to determining that the structured format is a non-universal format of the one or more non-universal formats:

generate, based on the input string, one or more fallback data objects associated with the input string, wherein each of the one or more fallback data objects is associated with a respective universal format of the one or more universal formats;

generate a composite data object based on the input string and each of the one or more fallback data objects; and transmit the composite data object to each destination client device of one or more destination client devices.

18. The non-transitory computer storage medium of claim 17, wherein:

the one or more universal formats and the one or more non-universal formats are defined with respect to a structured format integration procedure, the structured format integration procedure comprises a plurality of software update releases associated with the communication system, the plurality of software update releases comprises one or more display-related update releases and one or more composition-related update releases, and the one or more display-related update releases are performed prior to the one or more composition-related update releases.

19. The non-transitory computer storage medium of claim 17, wherein the integration condition comprises an integration ratio for the supported structured format, and wherein the integration ratio is determined based on an updated device ratio for a software update release associated with the supported structured format.

20. The non-transitory computer storage medium of claim 17, wherein the one or more universal formats comprise a markup-based structured format and wherein the one or more non-universal formats comprise a serialization-based structured format.

* * * * *